US011955073B2

(12) United States Patent
Wang

(10) Patent No.: US 11,955,073 B2
(45) Date of Patent: Apr. 9, 2024

(54) PIXEL COMPENSATION CIRCUIT, DRIVING METHOD THEREOF AND DISPLAY DEVICE

(71) Applicant: BOE Technology Group Co., Ltd., Beijing (CN)

(72) Inventor: Li Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 229 days.

(21) Appl. No.: 17/428,906

(22) PCT Filed: Feb. 24, 2021

(86) PCT No.: PCT/CN2021/077626
§ 371 (c)(1),
(2) Date: Aug. 5, 2021

(87) PCT Pub. No.: WO2021/169989
PCT Pub. Date: Sep. 2, 2021

(65) Prior Publication Data

US 2023/0178015 A1 Jun. 8, 2023

(30) Foreign Application Priority Data

Feb. 28, 2020 (CN) ......................... 202010130632.5

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01);
(Continued)

(58) Field of Classification Search
None
See application file for complete search history.

(56) References Cited

U.S. PATENT DOCUMENTS

2006/0132054 A1 6/2006 Kim et al.
2011/0157144 A1* 6/2011 Park .................... G09G 3/3233
345/212

(Continued)

FOREIGN PATENT DOCUMENTS

CN 102314829 A 1/2012
CN 105810144 A 7/2016

(Continued)

OTHER PUBLICATIONS

CN 2020101306325 first office action.
PCT/CN2021/077626 international search report and written opinion.

*Primary Examiner* — Benjamin X Casarez
(74) *Attorney, Agent, or Firm* — IPro, PLLC

(57) ABSTRACT

A pixel compensation circuit and a driving method thereof are provided. The pixel compensation circuit includes a resetting unit, a write-in unit, a light-emitting unit, a storage capacitor and a driving transistor. The resetting unit is configured to receive a resetting signal and release electric energy on the storage capacitor and an electroluminescence element. The write-in unit is configured to receive a gate driving signal and write display data into a holding node coupled to the storage capacitor. The light-emitting unit is configured to receive a light-emitting signal and turn on the driving transistor to enable the electroluminescence element to emit light. A compensation unit is added between the holding node and a high potential end and configured to generate a reverse current for compensating a leakage current of the resetting unit.

6 Claims, 5 Drawing Sheets

(52) U.S. Cl.
CPC ............... *G09G 2320/0247* (2013.01); *G09G 2330/021* (2013.01)

(56) References Cited

U.S. PATENT DOCUMENTS

| | | | | |
|---|---|---|---|---|
| 2012/0001893 | A1 | 1/2012 | Jeong et al. | |
| 2016/0351122 | A1 | 12/2016 | Jung et al. | |
| 2017/0076671 | A1 | 3/2017 | Kim et al. | |
| 2017/0256200 | A1* | 9/2017 | Duan | G09G 3/3233 |
| 2018/0033370 | A1 | 2/2018 | Zheng | |
| 2018/0158407 | A1* | 6/2018 | Chai | G09G 3/3258 |
| 2018/0211592 | A1 | 7/2018 | Li | |
| 2018/0233085 | A1 | 8/2018 | Wang | |
| 2020/0302859 | A1 | 9/2020 | Wang et al. | |
| 2020/0320937 | A1* | 10/2020 | Yang | G09G 3/3258 |
| 2021/0175310 | A1 | 6/2021 | Ka et al. | |
| 2021/0193036 | A1* | 6/2021 | Huang | G09G 3/3233 |
| 2021/0193046 | A1* | 6/2021 | Wang | G09G 3/3258 |
| 2021/0312866 | A1 | 10/2021 | Fan et al. | |
| 2023/0142259 | A1* | 5/2023 | Liu | G09G 3/3233<br>345/206 |

FOREIGN PATENT DOCUMENTS

| | | | |
|---|---|---|---|
| CN | 106205486 | A | 12/2016 |
| CN | 106548753 | A | 3/2017 |
| CN | 106601191 | A | 4/2017 |
| CN | 106875894 | A | 6/2017 |
| CN | 107564468 | A | 1/2018 |
| CN | 107665672 | A | 2/2018 |
| CN | 110264946 | A | 9/2019 |
| CN | 111179841 | A | 5/2020 |
| KR | 20150062349 | A | 6/2015 |

* cited by examiner

PIXEL COMPENSATION CIRCUIT, DRIVING METHOD THEREOF AND DISPLAY DEVICE

CROSS-REFERENCE TO RELATED APPLICATION

The present application is the U.S. national phase of PCT application No. PCT/2021/077626 filed on Feb. 24, 2021, which claims a priority of the Chinese Patent Application No. 202010130632.5 filed on Feb. 28, 2020, which is incorporated herein by reference in its entirety.

TECHNICAL FIELD

The present disclosure relates to the field of display technology, in particular to a pixel compensation circuit, a driving method thereof and a display device.

BACKGROUND

In order to increase a stand-by time and reduce power consumption of an electronic product, a low-frame-rate driving technology has become one of the mainstream schemes. However, in a long frame period, when a pixel emits light, an Organic Light-Emitting Diode (OLED) emits light unstably. Therefore, it is particularly important to ensure the light-emission stability of the pixel in the long frame period.

SUMMARY

In one aspect, the present disclosure provides in some embodiments a pixel compensation circuit, including a resetting unit, a write-in unit, a light-emitting unit, a storage capacitor and a driving transistor. The resetting unit is configured to receive a resetting signal and release electric energy on the storage capacitor and an electroluminescence element. The write-in unit is configured to receive a gate driving signal and write display data into a holding node coupled to the storage capacitor. The light-emitting unit is configured to receive a light-emitting signal and turn on the driving transistor to enable the electroluminescence element to emit light. A compensation unit is added between the holding node and a high potential end and configured to generate a reverse current for compensating a leakage current of the resetting unit.

In a possible embodiment of the present disclosure, the compensation unit includes a first compensation transistor and a second compensation transistor. A gate electrode of the first compensation transistor is configured to receive the light-emitting signal, a first electrode of the first compensation transistor is coupled to the holding node, a second electrode of the first compensation transistor is coupled to a first electrode of the second compensation transistor, and a gate electrode and a second electrode of the second compensation transistor are configured to receive the resetting signal.

In a possible embodiment of the present disclosure, the compensation unit includes a first compensation transistor and a second compensation transistor. A gate electrode of the first compensation transistor is configured to receive the light-emitting signal, a first electrode of the first compensation transistor is coupled to the holding node, a second electrode of the first compensation transistor is coupled to a first electrode of the second compensation transistor, and a gate electrode and a second electrode of the second compensation transistor are configured to receive the gate driving signal.

In a possible embodiment of the present disclosure, the compensation unit includes a first compensation transistor and a second compensation transistor. A gate electrode of the first compensation transistor is configured to receive the light-emitting signal, a first electrode of the first compensation transistor is coupled to the holding node, a second electrode of the first compensation transistor is coupled to a first electrode of the second compensation transistor, a gate electrode of the second compensation transistor is configured to receive the resetting signal, a second electrode of the second compensation transistor is coupled to a first power source, and the first power source is at a high level.

In a possible embodiment of the present disclosure, the compensation unit includes a first compensation transistor and a second compensation transistor. A gate electrode of the first compensation transistor is configured to receive the light-emitting signal, a first electrode of the first compensation transistor is coupled to the holding node, a second electrode of the first compensation transistor is coupled to a first electrode of the second compensation transistor, a gate electrode of the second compensation transistor is configured to receive the gate driving signal, and a second electrode of the second compensation transistor is coupled to a first power source.

In a possible embodiment of the present disclosure, the resetting unit includes a first resetting transistor and a second resetting transistor. A gate electrode of the first resetting transistor is configured to receive the resetting signal, a first electrode of the first resetting transistor is coupled to the holding node, a second electrode of the first resetting transistor is coupled to a second power source, a gate electrode of the second compensation transistor is configured to receive the resetting signal, a first electrode of the second compensation transistor is coupled to an anode of the electroluminescence element, and a second electrode of the second compensation transistor is coupled to the second power source.

In a possible embodiment of the present disclosure, the write-in unit includes a first write-in transistor and a second write-in transistor. A gate electrode of the first write-in transistor is configured to receive the gate driving signal, a first electrode of the first write-in transistor is configured to receive the display data, a second electrode of the first write-in transistor is coupled to a first electrode of the driving transistor, a gate electrode of the second write-in transistor is configured to receive the gate driving signal, a first electrode of the second write-in transistor is coupled to the holding node, and a second electrode of the second write-in transistor is coupled to a second electrode of the driving transistor.

In a possible embodiment of the present disclosure, the light-emitting unit includes a first light-emitting transistor and a second light-emitting transistor. A gate electrode of the first light-emitting transistor is configured to receive the light-emitting signal, a first electrode of the first light-emitting transistor is coupled to a first power source, a second electrode of the first light-emitting transistor is coupled to a first electrode of the driving transistor, a gate electrode of the second light-emitting transistor is configured to receive the light-emitting signal, a first electrode of the second light-emitting transistor is coupled to a second electrode of the driving transistor, and a second electrode of the second light-emitting transistor is coupled to an anode of the electroluminescence element.

In another aspect, the present disclosure provides in some embodiments a method for driving a pixel compensation circuit, including: in the case that a first compensation transistor is turned off and the compensation unit does not work, enabling a first resetting transistor to be turned on under the control of a resetting signal so as to enable a second end of a storage capacitor to electrically coupled to a second power source and release electric energy on the storage capacitor, and enabling a second resetting transistor to be turned on so as to enable an anode of an electroluminescence element to be electrically coupled to the second power source and release electric energy on the electroluminescence element; in the case that the first compensation transistor is turned off and the compensation unit does not work, enabling a first write-in transistor and a second write-in transistor to be turned on under the control of a gate driving signal, so as to enable display data to charge the storage capacitor through the first write-in transistor, a driving transistor and the second write-in transistor and write the display data into a holding node; and in the case that the first compensation transistor is turned on, a second compensation transistor is turned off, a potential at a second electrode of the second compensation transistor is higher than a potential at the holding node, and a compensation leakage current flowing to the holding node is generated on the second compensation transistor, enabling a first light-emitting transistor and a second light-emitting transistor to be turned on under the control of a light-emitting signal, and enabling the driving transistor to be turned on, so as to drive the electroluminescence element to emit light.

In yet another aspect, the present disclosure provides in some embodiments a display device including the above-mentioned pixel compensation circuit.

BRIEF DESCRIPTION OF THE DRAWINGS

Through reading the description with reference to the following drawings, the other features, objects and advantages will become more apparent.

DETAILED DESCRIPTION

Figure 1:
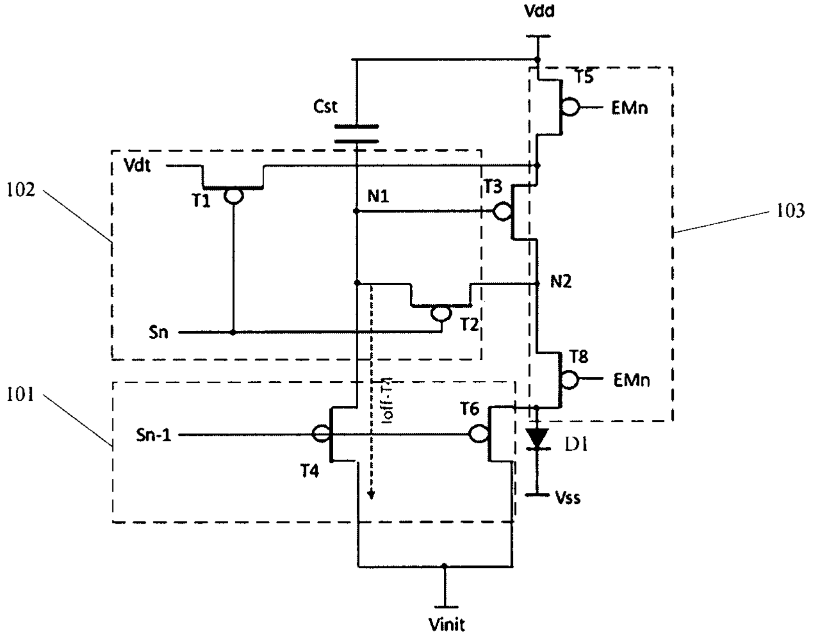
FIG. 1 is a circuit diagram of a pixel driving circuit in the related art.

The present disclosure will be described hereinafter in conjunction with the drawings and embodiments. The following embodiments are for illustrative purposes only, but shall not be used to limit the scope of the present disclosure. It should be appreciated that, for ease of description, merely parts related to the present disclosure are shown in the drawings.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case of no conflict, the embodiments of the present disclosure and the features therein may be combined. The present disclosure will be described hereinafter in conjunction with the drawings and embodiments.

It is found that, within a frame period between two signal refreshes of a pixel driving circuit, a Voltage Holding Ratio (VHR) of a storage capacitor determines stability and an effective average value of a pixel OLED driving current. A leakage current of a loop consisting of switch thin film transistors (STFTs) has a direct impact on the VHR of the storage capacitor, resulting in a flicker (Flicker).

Due to defects or deficiencies in the related art, an object of the present disclosure is to provide a pixel compensation circuit, a driving method thereof and a display device, so as to achieve stable display under low-frame-rate driving.

Referring to FIG. 1, which shows a conventional pixel driving circuit. The pixel driving circuit includes a resetting unit 101, a write-in unit 102, a light-emitting unit 103, a storage capacitor Cst and a driving transistor T3.

The resetting unit 101 is configured to receive a resetting signal $S_{n-1}$ so as to release electric energy of the storage capacitor Cst and an electroluminescence element D1.

The write-in unit 102 is configured to receive a gate driving signal Sn and write display data into a holding node N1 coupled to the storage capacitor Cst.

The light-emitting unit 103 is configured to receive a light-emitting signal EMn and turn on the driving transistor T3 so as to enable the electroluminescence element D1 to emit light.

In the case of low-frame-rate driving, a light-emitting stage of the driving circuit is prolonged. At this time, due to the existence of a leakage current $I_{off\text{-}T4}$ of the resetting unit, a voltage of a second end of the storage capacitor (that is, the holding node N1) is easily pulled down, so a key issue is how to compensate for the leakage current.

In order to solve the above problem, a technical scheme involving a compensation unit is provided in the embodiments of the present disclosure.

Referring to FIGS. 2 to 5, a compensation unit 104 is added between a holding node N1 and a high potential end to generate a reverse current for compensating a leakage current $I_{off\text{-}T4}$ of a resetting unit 101. A compensation current flows in a direction opposite to the leakage current $I_{off\text{-}T4}$ of the resetting unit 101, so as to charge the holding node. In this way, it is able to maintain a voltage of the holding node at a specified value, thereby to prevent the occurrence of the flicker caused by low-frame-rate driving.

Specifically, the following circuits are adopted.

Figure 2:
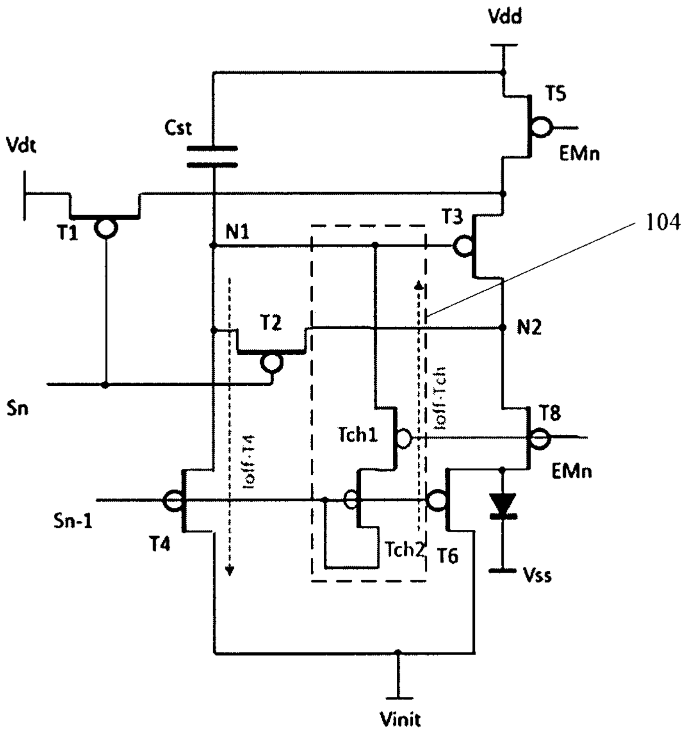
FIG. 2 is a circuit diagram of a pixel compensation circuit according to a first embodiment of the present disclosure.

As shown in FIG. 2, the compensation unit 104 includes a first compensation transistor $T_{ch1}$ and a second compensation transistor $T_{ch2}$. A gate electrode of the first compensation transistor $T_{ch1}$ is configured to receive a light-emitting signal EMn, a first electrode of the first compensation transistor $T_{ch1}$ is coupled to the holding node N1, a second electrode of the first compensation transistor is coupled to a first electrode of the second compensation transistor $T_{ch2}$, and a gate electrode and a second electrode of the second compensation transistor $T_{ch2}$ are configured to receive a resetting signal $S_{n-1}$.

Figure 7:
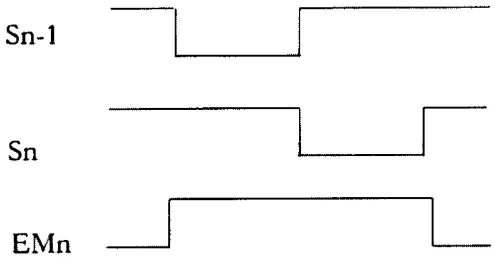
FIG. 7 is a sequence diagram of an input signal for the pixel compensation circuit according to one embodiment of the present disclosure.

It should be appreciated that, in actual use, each transistor is an N-type transistor or P-type transistor. In the embodiments of the present disclosure, the transistor is an N-type transistor. A sequence diagram of each input signal is shown in FIG. 7.

A working mode of the circuit is described as follows.

At a resetting stage, in the case that the resetting signal $S_{n-1}$ is a low level, the light-emitting signal EMn is a high level, so the first compensation transistor is turned off, and the compensation unit does not work.

At a write-in stage, in the case that the gate driving signal $S_n$ is a low level, the light-emitting signal EMn is a high level, so the first compensation transistor is turned off, and the compensation unit does not work.

At a light emitting stage, the light-emitting signal EMn is a low level, and the resetting signal $S_{n-1}$ is a high level, so the first compensation transistor $T_{ch1}$ is turned on, the second compensation transistor $T_{ch2}$ is turned off, and a potential at the second electrode of the second compensation transistor is higher than a potential at the holding node. At this time, the second transistor generates a compensation leakage current $I_{off-Tch}$ flowing to the holding node.

Figure 3:
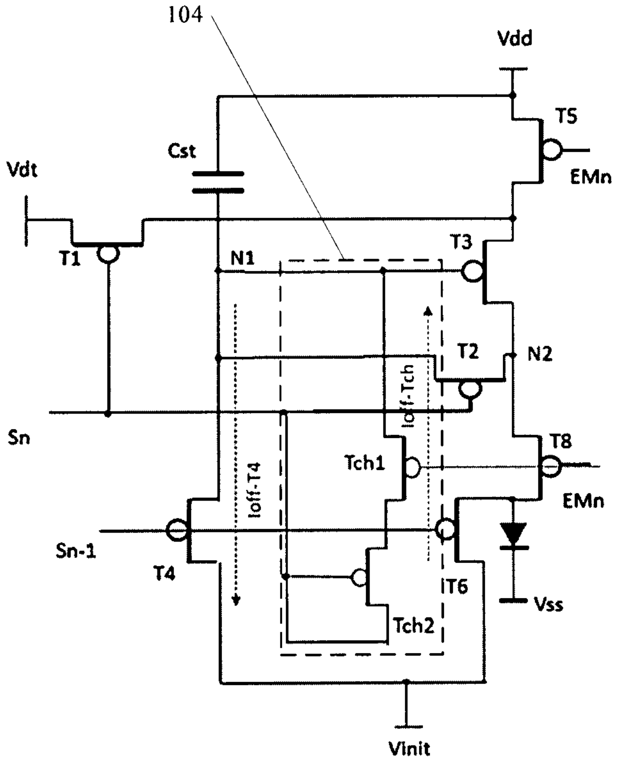
FIG. 3 is a circuit diagram of the pixel compensation circuit according to a second embodiment of the present disclosure.

As shown in FIG. 3, the compensation unit 104 includes a first compensation transistor $T_{ch1}$ and a second compensation transistor $T_{ch2}$. A gate electrode of the first compensation transistor $T_{ch1}$ is configured to receive the light-emitting signal EMn, a first electrode of the first compensation transistor $T_{ch1}$ is coupled to the holding node N1, a second electrode of the first compensation transistor is coupled to a first electrode of the second compensation transistor $T_{ch2}$, and a gate electrode and a second electrode of the second compensation transistor $T_{ch2}$ are configured to receive the resetting signal $S_n$.

A working mode of the circuit is described as follows.

At the resetting stage, in the case that the resetting signal $S_{n-1}$ is a low level, the light-emitting signal EMn is a high level, so the first compensation transistor is turned off, and the compensation unit does not work.

At the write-in stage, in the case that the gate driving signal $S_n$ is a low level, the light-emitting signal EMn is a high level, so the first compensation transistor is turned off, and the compensation unit does not work.

At the light-emitting stage, the light-emitting signal EMn is a low level and the gate driving signal $S_n$ is a high level, so the first compensation transistor $T_{ch1}$ is turned on, the second compensation transistor $T_{ch2}$ is turned off, and a potential at the second electrode of the second compensation transistor is higher than a potential at the holding node. At this time, the second compensation transistor generates the compensation leakage current $I_{off-Tch}$ flowing to the holding node.

Figure 4:
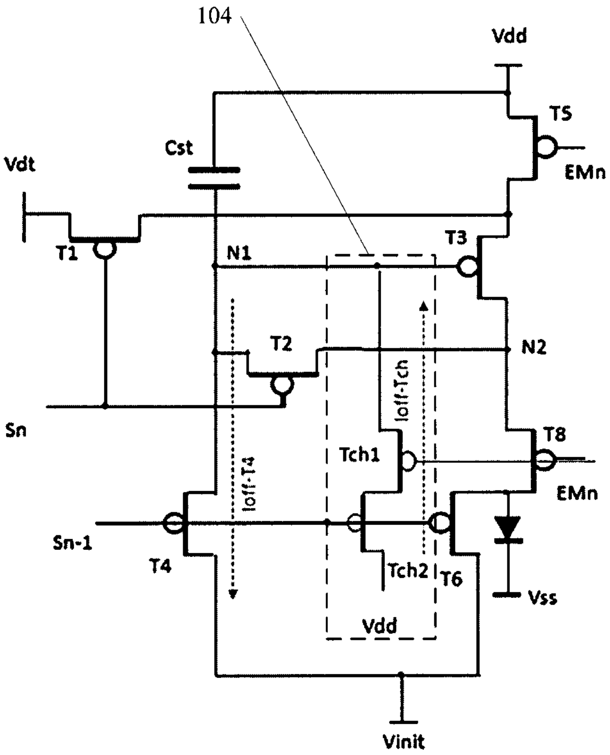
FIG. 4 is a circuit diagram of the pixel compensation circuit according to a third embodiment of the present disclosure.

As shown in FIG. 4, the compensation unit 104 includes a first compensation transistor $T_{ch1}$ and a second compensation transistor $T_{ch2}$. A gate electrode of the first compensation transistor $T_{ch1}$ is configured to receive the light-emitting signal EMn, a first electrode of the first compensation transistor $T_{ch1}$ is coupled to the holding node N1, a second electrode of the first compensation transistor is coupled to a first electrode of the second compensation transistor $T_{ch2}$, a gate electrode of the second compensation transistor $T_{ch2}$ is configured to receive the resetting signal $S_{n-1}$, a second electrode of the second compensation transistor is coupled to a first power source Vdd, and the first power source outputs a high level signal.

A working mode of the circuit is described as follows.

At the resetting stage, in the case that the resetting signal $S_{n-1}$ is a low level, the light-emitting signal EMn is a high level, so the first compensation transistor is turned off, and the compensation unit does not work.

At the write-in stage, in the case that the gate driving signal $S_n$ is a low level, the light-emitting signal EMn is high level, so the first compensation transistor is turned off, and the compensation unit does not work.

At the light-emitting stage, the light-emitting signal EMn is a low level and the resetting signal $S_{n-1}$ is high level, so the first compensation transistor $T_{ch1}$ is turned on, the second compensation transistor $T_{ch2}$ is turned off, and a potential at the second electrode of the second compensation transistor is higher than a potential at the holding node. At this time, the second compensation transistor generates the compensation leakage current $I_{off-Tch}$ flowing to the holding node.

Figure 5:
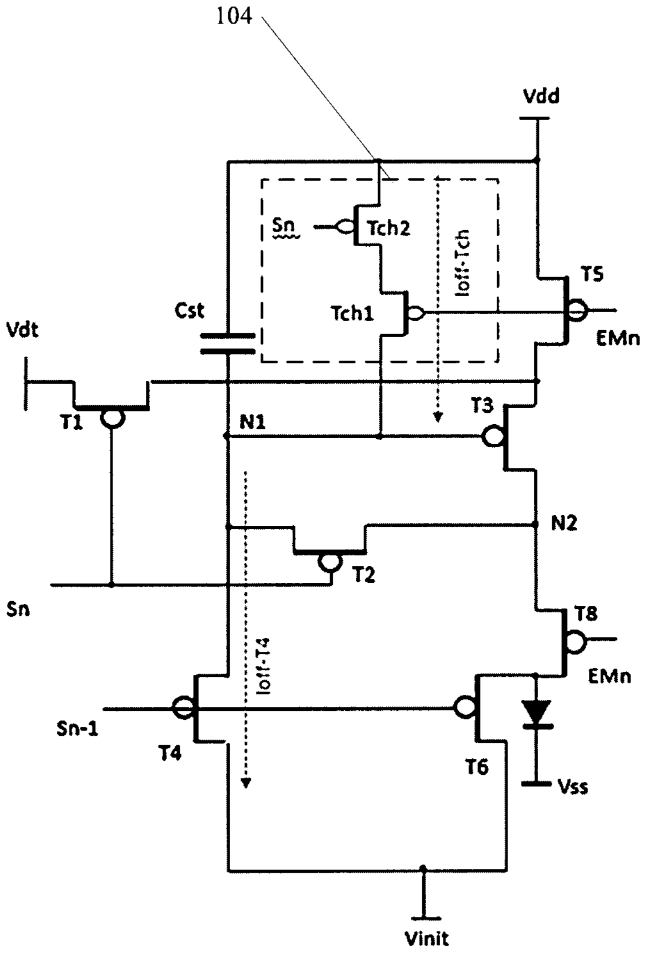
FIG. 5 is a circuit diagram of the pixel compensation circuit according to a fourth embodiment of the present disclosure.

As shown in FIG. 5, the compensation unit 104 includes a first compensation transistor $T_{ch1}$ and a second compensation transistor $T_{ch2}$. A gate electrode of the first compensation transistor $T_{ch1}$ is configured to receive the light-emitting signal EMn, a first electrode of the first compensation transistor $T_{ch1}$ is coupled to the holding node N1, a second electrode of the first compensation transistor is coupled to a first electrode of the second compensation transistor $T_{ch2}$, a gate electrode of the second compensation transistor $T_{ch2}$ is configured to receive the gate driving signal $S_n$, a second electrode of the second compensation transistor is coupled to a first power source Vdd, and the first power source outputs a high level signal.

A working mode of the circuit is described as follows.

At the resetting stage, in the case that the resetting signal $S_{n-1}$ is a low level, the light-emitting signal EMn is a high level, so the first compensation transistor is turned off, and the compensation unit does not work.

At the write-in stage, in the case that the gate driving signal $S_n$ is a low level, the light-emitting signal EMn is a high level, so the first compensation transistor is turned off, and the compensation unit does not work.

At the light-emitting stage, the light-emitting signal EMn is a low level and the gate driving signal $S_n$ is a high level, the first compensation transistor $T_{ch1}$ is turned on, the second compensation transistor $T_{ch2}$ is turned off, a potential at the second electrode of the second compensation transistor is higher than a potential at the holding node. At this time, the second compensation transistor generates the compensation leakage current $I_{off-Tch}$ flowing to the holding node.

In some embodiments of the present disclosure, the compensation unit includes a first compensation transistor and a second compensation transistor. A gate electrode of the first compensation transistor is configured to receive the light-emitting signal, a first electrode of the first compensation transistor is coupled to the holding node, a second electrode of the first compensation transistor is coupled to a first electrode of the second compensation transistor, a gate electrode of the second compensation transistor is configured to receive the gate driving signal, and a second electrode of the second compensation transistor is coupled to a first power source.

In some embodiments of the present disclosure, the resetting unit 101 includes a first resetting transistor T4 and a second resetting transistor T6. A gate electrode of the first resetting transistor T4 is configured to receive the resetting signal $S_{n-1}$, a first electrode of the first resetting transistor T4 is coupled to the holding node N1, a second electrode of the first resetting transistor is coupled to a second power source Vinit, a gate electrode of the second compensation transistor is configured to receive the resetting signal $S_{n-1}$, a first electrode of the second compensation transistor is coupled to an anode of the electroluminescence element D1, and a second electrode of the second compensation transistor is coupled to the second power source Vinit.

In some embodiments of the present disclosure, the write-in unit 102 includes a first write-in transistor T1 and a second write-in transistor T2. A gate electrode of the first write-in transistor T1 is configured to receive the gate driving signal $S_n$, a first electrode of the first write-in transistor is configured to receive display data Vdt, a second electrode of the first write-in transistor is coupled to a first electrode of the driving transistor T3, a gate electrode of the second write-in transistor is configured to receive the gate driving signal $S_n$, a first electrode of the second write-in transistor is coupled to the holding node N1, and a second electrode of the second write-in transistor is coupled to a second electrode of the driving transistor.

In some embodiments of the present disclosure, the light-emitting unit 103 includes a first light-emitting transistor T5 and a second light-emitting transistor T8. A gate electrode of the first light-emitting transistor T5 is configured to receive the light-emitting signal EMn, a first electrode of the first light-emitting transistor T5 is coupled to the first power source Vdd, a second electrode of the first light-emitting transistor is coupled to a first electrode of the driving transistor, a gate electrode of the second light-emitting transistor T8 is configured to receive the light-emitting signal EMn, a first electrode of the second light-emitting transistor is coupled to the second electrode of the driving transistor, and a second electrode of the second light-emitting transistor is coupled to the anode of the electroluminescence element D1.

Figure 6:
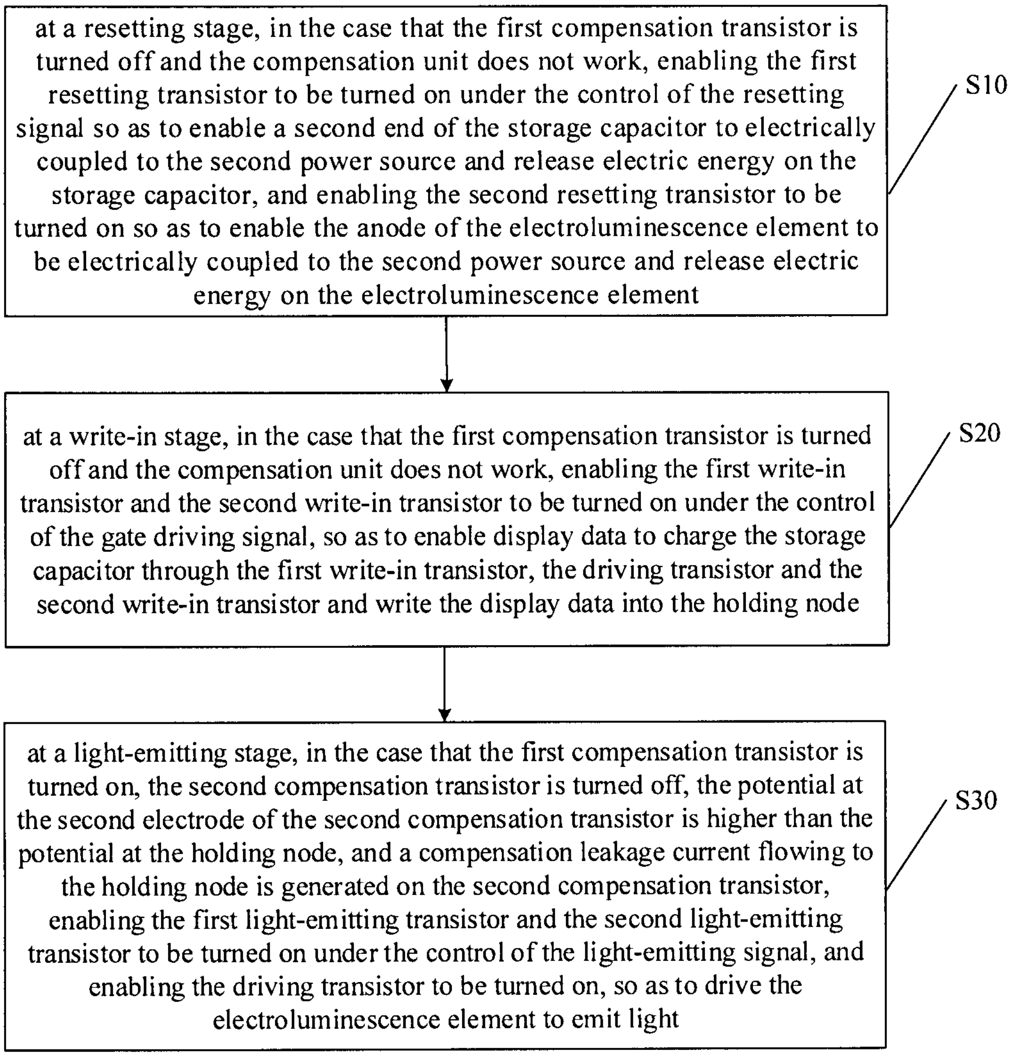
FIG. 6 is a flow chart of a method for driving the pixel compensation circuit according to one embodiment of the present disclosure.

The present disclosure further provides in some embodiments a method for driving the above-mentioned pixel compensation circuit. As shown in FIG. 6, the method includes the following steps.

Step S10: at a resetting stage, the first compensation transistor $T_{ch1}$ is turned off, the compensation unit 104 does not work, and the driving transistor T3 is turned on. The first resetting transistor T4 is turned on under the control of the resetting signal $S_{n-1}$, so as to enable the second end of the storage capacitor Cst to be electrically coupled to the second power source Vinit, and release the electric energy on the storage capacitor. The second resetting transistor T6 is turned on, so as to enable the anode of the electroluminescence element D1 to be electrically coupled to the second power source Vinit and release the electric energy on the electroluminescence element.

At the resetting stage, the first resetting transistor and the second resetting transistor are turned on under the control of the resetting signal $S_{n-1}$, so as to release the electric energy on the storage capacitor and the electroluminescence element.

Step S20: at the write-in stage, the first compensation transistor $T_{ch1}$ is turned off, and the compensation unit does not work. The first write-in transistor T1 and the second write-in transistor T2 are turned on under the control of the gate driving signal $S_n$, so as to enable the display data Vdt to charge the storage capacitor Cst through the first write-in transistor T1, the driving transistor T3 and the second write-in transistor T2, and write the display data into the holding node.

The first write-in transistor and the second write-in transistor of the write-in unit are turned on under the control of the gate driving signal, so as to store the display data in the storage capacitor, that is, write the display data into the holding node.

Step S30: At the light-emitting stage, the first compensation transistor $T_{ch1}$ is turned on, the second compensation transistor $T_{ch2}$ is turned off, and the potential at the second electrode of the second compensation transistor is higher than the potential at the holding node N1. At this time, the compensation leakage current $I_{off\text{-}Tch}$ flowing to the holding node is generated on the second compensation transistor. The first light-emitting transistor T5 and the second light-emitting transistor T8 are turned on under the control of the light-emitting signal EMn, and the driving transistor T3 is turned on so as to drive the electroluminescence element to emit light.

The first light-emitting transistor and the second light-emitting transistor of the light-emitting unit are turned on under the control of the light-emitting signal. When Vgs of the driving transistor is greater than Vth, the driving transistor is also turned on so as to drive the electroluminescence element to emit light. Vgs represents a voltage between a source electrode and the gate electrode, and Vth represents a threshold voltage.

The present disclosure further provides in some embodiments a display device including the above-mentioned pixel compensation circuit.

According to the embodiments of the present disclosure, the compensation unit is added between the holding node and the high potential end so as to generate the reverse current for compensating the leakage current of the resetting unit. As a result, it is able to prevent the occurrence of unstable display caused by the leakage current of the resetting unit under low-frame-rate driving.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel compensation circuit, comprising a resetting unit, a write-in unit, a light-emitting unit, a storage capacitor and a driving transistor, wherein the resetting unit is configured to receive a resetting signal and release electric energy on the storage capacitor and an electroluminescence element;

the write-in unit is configured to receive a gate driving signal and write display data into a holding node coupled to the storage capacitor;

the light-emitting unit is configured to receive a light-emitting signal and turn on the driving transistor to enable the electroluminescence element to emit light; and a compensation unit is added between the holding node and a high potential end and configured to generate a reverse current for compensating a leakage current of the resetting unit;

the compensation unit comprises a first compensation transistor and a second compensation transistor, a gate electrode of the first compensation transistor is configured to receive the light-emitting signal, a first electrode of the first compensation transistor is directly coupled to the holding node, and a second electrode of the first compensation transistor is directly coupled to a first electrode of the second compensation transistor; and a gate electrode and a second electrode of the second compensation transistor are configured to receive the gate driving signal.

2. The pixel compensation circuit according to claim 1, wherein the resetting unit comprises a first resetting transistor and a second resetting transistor, wherein a gate electrode of the first resetting transistor is configured to receive the resetting signal, a first electrode of the first resetting transistor is coupled to the holding node, a second electrode of the first resetting transistor is coupled to a second power source, a gate electrode of the second resetting transistor is configured to receive the resetting signal, a first electrode of the second resetting transistor is coupled to an anode of the electroluminescence element, and a second electrode of the second resetting transistor is coupled to the second power source.

3. The pixel compensation circuit according to claim 1, wherein the write-in unit comprises a first write-in transistor and a second write-in transistor, wherein a gate electrode of the first write-in transistor is configured to receive the gate driving signal, a first electrode of the first write-in transistor is configured to receive the display data, a second electrode of the first write-in transistor is coupled to a first electrode of the driving transistor, a gate electrode of the second write-in transistor is configured to receive the gate driving signal, a first electrode of the second write-in transistor is coupled to the holding node, and a second electrode of the second write-in transistor is coupled to a second electrode of the driving transistor.

4. The pixel compensation circuit according to claim 1, wherein the light emitting unit comprises a first light-emitting transistor and a second light-emitting transistor, wherein a gate electrode of the first light-emitting transistor is configured to receive the light-emitting signal, a first electrode of the first light-emitting transistor is coupled to a first power source, a second electrode of the first light-emitting transistor is coupled to a first electrode of the driving transistor, a gate electrode of the second light-emitting transistor is configured to receive the light-emitting signal, a first electrode of the second light-emitting transistor is coupled to a second electrode of the driving transistor, and a second electrode of the second light-emitting transistor is coupled to an anode of the electroluminescence element.

5. A method for driving the pixel compensation circuit according to claim 1, comprising:

in the case that the first compensation transistor is turned off and the compensation unit does not work, enabling a first resetting transistor in the resetting unit to be turned on under the control of the resetting signal so as to enable a second end of the storage capacitor to be electrically coupled to a second power source and release electric energy on the storage capacitor, and enabling a second resetting transistor in the resetting unit to be turned on so as to enable an anode of the electroluminescence element to be electrically coupled to the second power source and release electric energy on the electroluminescence element;

in the case that the first compensation transistor is turned off and the compensation unit does not work, enabling a first write-in transistor and a second write-in transistor in the write-in unit to be turned on under the control of the gate driving signal, so as to enable display data to charge the storage capacitor through the first write-in transistor, the driving transistor and the second write-in transistor and write the display data into the holding node; and in the case that the first compensation transistor is turned on, the second compensation transistor is turned off, a potential at a second electrode of the second compensation transistor is higher than a potential at the holding node, and a compensation leakage current flowing to the holding node is generated on the second compensation transistor, enabling a first light-emitting transistor and a second light-emitting transistor in the light-emitting unit to be turned on under the control of the light-emitting signal, and enabling the driving transistor to be turned on, so as to drive the electroluminescence element to emit light.

6. A display device, comprising the pixel compensation circuit according to claim 1.

* * * * *